United States Patent Office 3,379,049
Patented Apr. 23, 1968

3,379,049
METHOD FOR TESTING OPTICAL MEMBRANES
Marcel J. E. Golay, 116 Ridge Road,
Rumson, N.J. 07760
No Drawing. Filed Dec. 9, 1965, Ser. No. 512,809
4 Claims. (Cl. 73—4)

ABSTRACT OF THE DISCLOSURE

A method of testing the surface tension characteristics of optical membranes by deforming the membrane under a vacuum and measuring the focal distance on the concave side. The product of the vacuum and the focal distance is a function of the surface tension of the membrane.

---

This invention relates to optical membranes of the type adapted to deflect under the application of pressure to one side of the membrane and thereby modulate a beam of light focused on the other side thereof in order to provide measurement of pressure. One example of such a membrane is disclosed in United States Patent No. 2,557,096.

More specifically this invention concerns a novel and improved method for testing optical membranes of the type referred to above to facilitate selection of individual membranes which will afford relatively uniform operation over extended periods of time.

While a thin optical membrane may be made in any suitable manner, one satisfactory procedure involves the evaporation of a metal such as antimony in a rarified atmosphere onto an organic membrane such as collodion or the like. The resultant structure when supported by an optically flat ring and when not submitted to any differential pressures are generally optically flat. This condition is preferable for the performance of a proper light modulating function.

In many cases, it has been found that membranes which possess the desired characteristics gradually wrinkle and therefore become unsuitable for use in the measurement of pressures when used in applications such as those described in the aforesaid United States Patent.

Membranes of collodion which have been coated with metals such as antimony are generally acceptable if they have a light reflectivity in the range of 15 percent to 90 percent. Such membranes must also exhibit suitable surface tension characteristics so that they will be substantially optically flat when not subjected to differential pressures and yet will exhibit the desired sensitivity to pressure changes.

Through the utilization of the novel and improved process in accordance with the invention, it is possible to determine those membranes which will exhibit the desired surface tension characteristics for extended periods of time and those membranes which will quickly lose these surface tension characteristics and will wrinkle within relatively short periods. This improved process includes the subjection of each membrane to a partial vacuum of a few millimeters of water and at the same time measuring the focal distance of the concave mirror thus formed. By multiplying the focal distance of the concave mirror by the vacuum applied to the reverse side of the film in terms of centimeters of water, a measurement of surface tension in terms of gram weight per centimeter is obtained. By repeating these measurements for each membrane at daily intervals during the first few days and then at intervals of several weeks for a period of two to three months, it has been found that the surface tension of certain membranes continues to decrease substantially to zero in which case wrinkling of the membrane can be observed. For other membranes, it has been found that, while the surface tension will decrease rapidly after the first few days, the rate of decrease of the surface tension gradually diminishes and ultimately reaches an asymptotic value. These latter membranes have been found to maintain excellent surface tension characteristics for extended periods of time and in most cases for indefinite periods.

In actual practice, it is desirable to select membranes having a surface tension of the order of .4 to 2.0 gram weight per centimeter since such membranes not only afford good assurance of indefinite life but will provide adequate membrane sensitivity. This is a significant factor since membrances with unduly high surface tensions will afford too little deflection and therefore will not afford the desired sensitivity to pressure variations.

Testing of membranes in accordance with the invention can be accelerated by maintaining the membranes in a relatively humid atmosphere since it has been found that high humidity will accelerate loss of surface tension. In this way, unsatisfactory membranes can be detected more rapidly and thus afford a considerable saving in time and cost in the selection of membranes that will maintain the desired characteristics for extended periods.

A simplification of the method described above which is less work demanding consists in storing the freshly made membranes for a period of at least several weeks, and preferably several months, and eliminating all the membranes which have developed any wrinkling. There is then a good probability that the remaining membranes have nearly reached an asymptotic tension and will remain under tension for an indefinite period thereafter.

While only one form of the invention has been described, it is apparent that alterations, modifications and changes may be made without departing from the true scope and spirit thereof as defined by the appended claims.

What is claimed is:

1. The method of selecting optical membranes formed by evaporating a thin metallic film on a thin substrate comprising the steps of subjecting one side of each membrane so formed and including said substrate and film to a measurable vacuum, directing light on the concave side of the membrane so deflected, and then measuring the focal distance of said deflected membrane, computing the product of said vacuum and said focal distance to afford a measurement of the surface tension of said membrane, and then repeating the aforesaid test periodically to select those membranes in which the surface tension becomes substantially asymptotic within a predetermined range.

2. The method according to claim 1 wherein said surface tension is measured in terms of grams per centimeter and the selected membranes have a surface tension in the range of .4 to 2.0 grams per centimeter.

3. The method according to claim 1 wherein said membranes are maintained in a humid atmosphere.

4. The method of selecting stable optical membranes formed by evaporating a thin metallic film onto a thin substrate and adapted for use in fluid pressure detecting devices comprising the steps of supporting said membranes to maintain them substantially optically flat, aging said membranes, and after an aging period of at least several weeks, selecting those membranes which are devoid of wrinkling, said membranes then having a relatively high probability of remaining devoid of wrinkles for an indefinite period of time.

References Cited

UNITED STATES PATENTS 2,557,096   6/1951—Golay _____ 250—83.3

DAVID SCHONBERG, Primary Examiner.

N. B. SIEGEL, Assistant Examiner.